United States Patent [19]

Ravaux

[11] Patent Number: 4,783,907

[45] Date of Patent: Nov. 15, 1988

[54] DEVICE FOR SIMULTANEOUSLY CUTTING AND TREATING A PLANT STEM

[76] Inventor: René Ravaux, 73 Grande Rue, 91510 Lardy, France

[21] Appl. No.: 43,284

[22] PCT Filed: Jun. 30, 1986

[86] PCT No.: PCT/FR86/00229
§ 371 Date: Apr. 30, 1987
§ 102(e) Date: Apr. 30, 1987

[87] PCT Pub. No.: WO87/00001
PCT Pub. Date: Jan. 15, 1987

[30] Foreign Application Priority Data

Jul. 4, 1985 [FR] France ............................. 85 10206
Oct. 22, 1985 [FR] France ............................. 85 15636

[51] Int. Cl.⁴ ........................................... A01G 3/00
[52] U.S. Cl. ................................. 30/123.3; 47/1 R
[58] Field of Search ................. 30/123.3, 123, 125, 30/131, 132, 134, 133; 47/1

[56] References Cited

U.S. PATENT DOCUMENTS 1,056,046  3/1913  Myers ............................ 30/123.3

FOREIGN PATENT DOCUMENTS 69421  11/1958  France ............................ 30/123.3

Primary Examiner—Douglas D. Watts
Attorney, Agent, or Firm—Sughrue, Mion, Zinn, Macpeak and Seas

[57] ABSTRACT

The device is essentially characterized by the fact that it comprises means for coating a cutting blade (9) with a viscous substance (20) arriving via a channel passing through the blade (9), and means including an anvil blade (84) for pressing the stem to be cut against the cutting edge (10) of the blade (9) in order to simultaneously cut the stem and treat the resulting wound on the stem by coating the wound with the substance (20) which is a treatment substance. The substance (20) is situated in a capsule (19) placed in a handle (13) supporting the cutting blade (9). The device is applicable, in particular, to pruning and treating vines, fruit trees, and other plants of the same type.

12 Claims, 4 Drawing Sheets

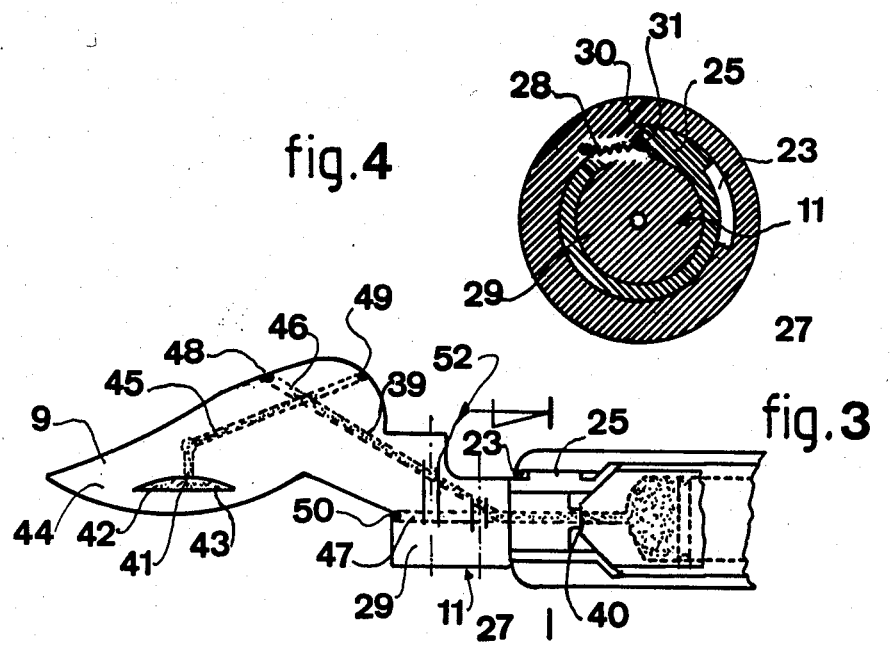
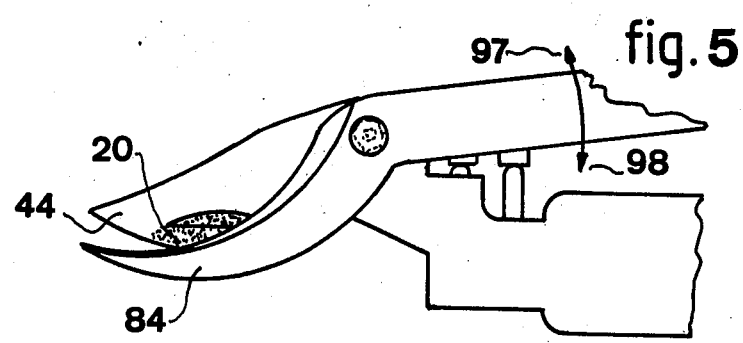
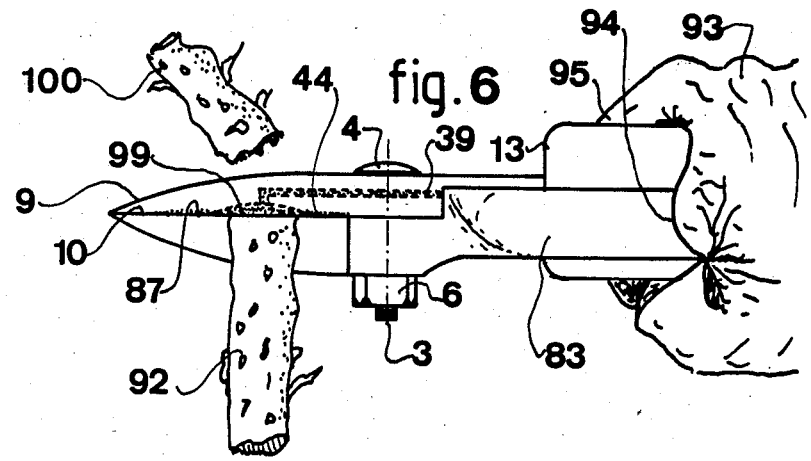

DEVICE FOR SIMULTANEOUSLY CUTTING AND TREATING A PLANT STEM

The present invention relates to devices for simultaneously cutting and treating a plant stem, such as, for example, vine stocks or shoots, the branches of fruit trees or ornamental trees, etc.

In all cultivation which gives rise to fruit, it is necessary to prune at certain periods. This is true, for example, of fruit trees, of vines, and of other plants of the same type. It is necessary to prune such plants periodically to give them vigor, to protect them against anarchic growth, etc.

No automatic machine exists for performing such pruning since it is absolutely essential for the person skilled in the art to determine the exact location at which pruning is to be performed on the basis of personal knowhow. Pruning is performed using a cutting implement of the secateur type.

When a plant is pruned, a pruning "wound" is inevitably inflicted thereon, and the wound must be protected and/or treated as must wounds on human beings.

When a large number of plants are to be pruned and then treated after pruning a problem arises. Since pruning is performed manually and cannot be performed any other way, it takes a certain length of time, and the pruning wounds inflicted may begin to become infected while the person skilled in the art continues pruning until pruning has been completed, prior to treating the wounds. A high loss percentage has been observed due to this procedure, in particular with vines.

In order to mitigate this drawback, proposals have been made to provide the person skilled in the art with a spray so that the wound can be sprayed each time a cut is made. However, experience has shown that such apparatus is bulky and that spraying is not performed regularly and at the right location or on each occasion.

In order to mitigate this drawback of bulk, and to be certain that each wound is treated, proposals have since been made to couple the spray system with the secateur. However, although this is an improvement over earlier methods, such new methods likewise suffer from drawbacks. Firstly, in order to ensure that the entire wound is covered in spray, the cone angle of the spray must be relatively wide, thereby causing a non-negligible quantity of treatment substance to be lost. Secondly, since the substance is to be sprayed, it must be in liquid form. This means that the volume of liquid substance which can be carried by a person and be used to treat only a small number of pruned plants, thus requiring the person skilled in the art to go away frequently to obtain refills of liquid to be sprayed. Experience has shown that the person does not spray on all occasions, particularly when time is short.

The aim of the present invention is to provide a device for simultaneously cutting and treating a plant stem, which device is simple to manufacture, easy to use, compact and ergonomic, while providing the advantages of minimizing consumption of the treatment substance and of ensuring that the treatment is applied each time a cut is made.

The present invention provides a device for simultaneously cutting and treating plant stems, the device comprising:
  at least one cutting blade;
  at least one anvil blade pivotally mounted relative to said cutting blade and including a surface suitable for sliding over at least a portion of one face of said cutting blade during rotation;
  at least one store of treatment substance;
  a channel for said substance made through at least one portion of the cutting blade and opening out via at least one orifice;
  means for controlling the transmission of a certain determined quantity of said substance from said store to said orifice;

characterized by the fact that said orifice via which said substance overflows is situated in said face of said cutting blade, said means for controlling transmission of said substance enabling a drop of said substance to be obtained at the outlet from said orifice when said surface of the anvil blade is opposite said face of the cutting blade.

Other characteristics and advantages of the present invention appear from the following description given by way of non-limiting illustration with reference to the accompanying drawings, in which:

FIG. 1 is a partially cut-away view of an embodiment of a device for simultaneously cutting and treating a plant stem in accordance with the invention;

FIGS. 2, 3, and 4 show details of the FIG. 1 embodiment of the device;

FIGS. 5 and 6 are views of the device shown in FIGS. 1 to 4 for explaining the operation of the device in accordance with the invention;

In all of the figures, the same references are used to designate the same elements.

Figures 1, 2:
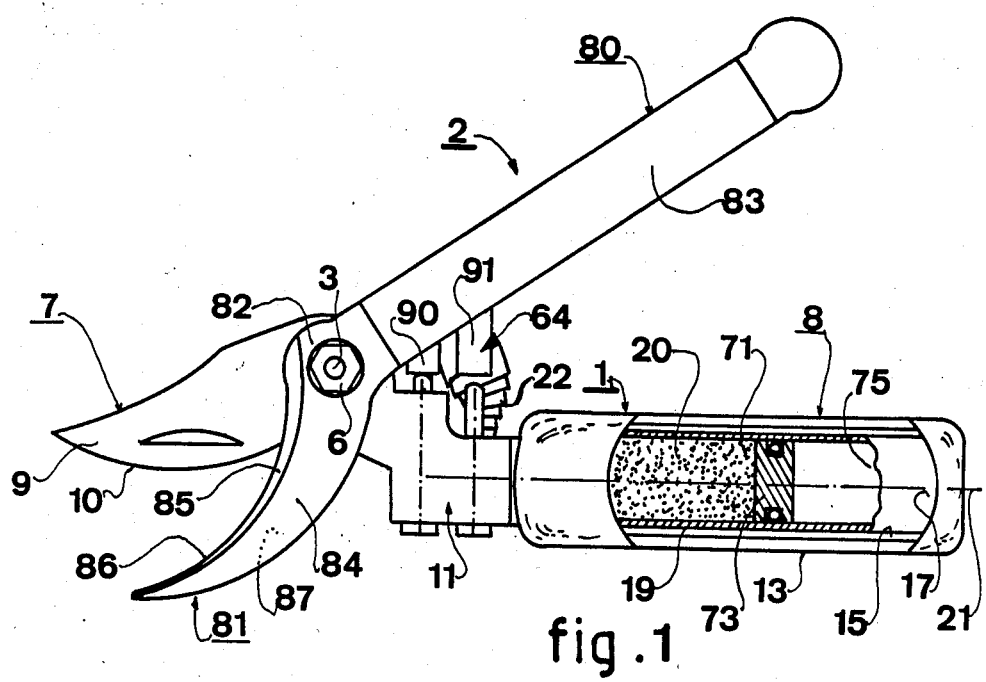

With reference more particularly to FIG. 1, this figure shows a device for simultaneously cutting and treating a plant stem, such as a vine shoot, a branch of a fruit tree, etc. It should be understood that the term "treatment" covers both preventive protection treatment and curative treatment for use in the event of illness, with these treatments using appropriate substances.

The device essentially comprises two main parts 1 and 2 which are pivotally mounted with respect to each other on a shaft 3 capable of having radially-directed flange means 4 at each end, optionally including a nut 5 on a threaded portion 6 of the shaft 3 (FIG. 6).

The main part 1 comprises two portions 7 and 8 which are fixed to each other via a mid portion 11, with the portions 7 and 8 being situated on opposite sides of the shaft 3, and the shaft 3 passing through the mid portion 11. The portion 7 constitutes a cutting blade 9 whose cutting edge 10 follows a convex curve.

The portion 8 constitutes a grasping handle 13 which is generally cylindrical in shape and which includes a hollow housing 15 including at least one large opening 17 enabling a capsule 19 to be inserted therein into a determined position, as described below.

Advantageously, the grasping handle 13 is slightly longer than the width of at least one hand and is pivotally mounted about its longitudinal axis 21 to the mid portion 11, being capable of rotating through a certain number of degrees, for example about thirty, with said value depending on several parameters and in particular on the possibility of rotating the part 2 relative to the part 1, as described below.

The two limit positions of such rotating are determined by a notch 23 provided in the end of the cylindrical handle 13 cooperating with a peg 25 (FIG. 4) which is fixed to the mid-portion 11. This peg 25 may be integrally formed with the mid-portion 11, or else it may be constituted (as shown) by a sleeve 27 applied over a more solid part 29. It is even possible for the handle 3 and the sleeve 27 to be connected by resilient means shown diagrammatically at 28 for simplification purposes and tending to return one edge, e.g. 30, of the notch 23 to a starting abutment against one side 31 of the peg 25 each time the device is used.

As mentioned above, the solid portion 29 includes a nozzle 33 (FIG. 3) running from the hollow housing 15 and terminating in a conical portion 34 facilitating its insertion into the end 35 of a capsule 19 which is provided, for this purpose, with an opening 37 which is lined, for example, with a sealing bushing 38 made of a resilient rubberized substance, for example.

A channel 39 runs through said nozzle 33 through the solid portion 19, through the portion 11, and through the blade 9, with one end of the channel 39 opening out at 40 in the center of the conical section 34 of the nozzle 33 and with its other end 41 opening out in the bottom of a notch 42 made in the surface of the blade 9. This notch is oblong in shape and constitutes a cavity in the thickness of the blade 9 having an opening 43 to the surface 44 of the cutting blade 9. This surface 44 of the blade is a portion of a plane surface which is suitable for co-operating with an anvil blade, as described below.

The channel 39 is advantageously made up of linear channel portions 45, 46, and 47 made by drilling and plugging at 48, 49, and 50 so as to provide a single channel 39 which is sealed between its two ends 40 and 41.

Advantageously, metering valve means 52 are associated with this channel 39 so as to allow only a certain quantity of substance having a determined volume to pass therealong, which substance is caused to flow along the channel 39 from the capsule 19.

A more detailed example of an embodiment of said controllable metering valve means 52 can be seen in FIG. 2. Two valves 53 and 54 are disposed in series along the channel 39 preferably within the mid-portion 11 and in the proximity of the axis of rotation 3. Each valve is constituted by a cylindrical piston 55 or 56 slidable in sealed manner in a cylindrical housing 57 or 58. The axes of these cylindrical housings intersect the axis of the channel 39 at a non-zero angle, and advantageously at right angles. The pistons have respective circular grooves 59 and 60 formed therein, which grooves are advantageously longer than the diameter of the channel 39. The two pistons are subjected to the action of respective springs 61 and 62 tending to urge them to "rest" positions while no external force is being exerted on the pistons. When the pistons are in their rest positions, they close the channel 39 in order to delimit a completely closed portion 63 thereof.

Control means 64 are associated with said metering valve means 52 and are advantageously coupled to the second main part 2 and are described below when describing said part.

These two pistons are controlled at determined moments so as to be displaced in parallel and synchronously, with the first valve 54 situated closer to the capsule 19 being opened first to enable the substance from the capsule to enter the portion 63 of the channel, with the other valve 53 being opened subsequently in order to allow a quantity of the substance to propagate along the channel 39 towards the notch 42. Thereafter, both valves are completely closed with the pistons being displaced in the opposite direction, thereby enabling the portion 63 of the channel to be re-filled with a determined quantity of the substance suitable for being subsequently transmitted along the channel towards the notch 42.

The capsule 19 containing the substance 20 includes a valve 66 controlling the outlet 37 situated at capsule end 65. The valve 66 has a seat 67 against which a ball-shaped valve member 68 is pressed by a spring 69. As a result, when the capsule 19 is inserted in the housing 15 so that the opening 37 fits over the end 34 of the nozzle 33, said end is sealed by the bushing 38 and the valve member 68 is pushed back so as to put the inside 71 of the capsule into communication with the channel 39.

The capsule is suitable for containing a substance 20 in the form of a gel or a grease. This substance is put under pressure by means, for example, of a piston 73 suitable for sliding in sealed manner inside said capsule, thereby separating the substance 20 from the end 75 of the capsule, with said end containing a gas under pressure to press against the piston and put the substance 20 under pressure so as to enable it to penetrate and flow along the channel 39 up to the notch 42.

As mentioned above, the device includes a second main part 2 constituted by two portions 80 and 81 interconnected by a mid-portion 82 through which the rotary shaft 3 passes, with said three portions being made as a single piece.

The portion 80 comprises a handle 83 which is substantially equal in length to the handle 13, i.e. slightly longer than the width of a hand. The second portion 81 is constituted by an anvil blade 84 having an anvil surface 85 whose edge 86 is concave in shape having a radius of curvature substantially equal to that of the cutting edge 10 of the blade 9. As mentioned above, the two main parts 1 and 2 are capable of pivoting relative to each other about the axis 3 so that the edge 86 of the anvil blade 84 rotates as defined above over or substantially over the surface 44 of the cutting blade 9 and in such a manner as to ensure that the surface 85 terminating at the edge 86 of the anvil surface 85 is substantially parallel to the surface 44 of the blade 9 and so that said two surfaces 44 and 87 are substantially parallel to each other as they rotate at a very small distance apart, and advantageously in direct contact so as to slide over each other.

In a highly advantageous embodiment, the rotation is determined such that at the end of the stroke, the two surfaces 44 and 87 overlap sufficiently for the notch 42 in the blade 9 to be partially or totally covered by the surface 87.

The two main parts are held in an open position by means of a spring 22, said position being shown in FIG. 1.

Finally, as mentioned above, the device includes control means 64 for controlling the metering valve means 52. It is highly advantageous for said control means to be coupled to the second main part 2. In the example shown, the control means are coupled to the handle 83. To do this, the two pistons 55 and 56 have their respective ends 88 and 89 emerging from the mid portion 11 on the side facing the handle 83. Abutment tabs 90 and 91 are fixed to the handle 83 and serve, as the handle 83 rotates relative to the handle 13, to come selectively against the projecting ends 88 and 84 of the two pistons in order to control sliding thereof, as described above, in order to control passage of the substance 20 towards the notch 42.

The above-described device operates as follows:

When the person skilled in the art wishes to prune a branch 92, for example, the device is grasped in the hand 93, e.g. the right hand, with the handle 83 being received in the palm 94 of the hand 93 and with the ends of the fingers 95 encircling the handle 13, with a capsule 19 full of the substance 20 being already inserted in the housing 15, as described above. The person then pivots the handles towards each other several times against the force exerted by the spring 22 which tends to move the handles apart from each other. As a result, successive doses of the substance 20 move along the channel 39 under the selective control of the two valves 53 and 54, as described above, and up to the notch 42 until at least one drop 96 appears at the outlet 41 leading into the notch, with said drop being advantageously sufficiently large to project proud from the surface 44 of the blade 9. When the anvil blade 84 has its surface 87 in contact with the surface 44 and when the two blades move apart from each other along arrow 97 as shown in FIG. 5, to occupy the position shown in FIG. 1, the anvil blade 84 spreads the substance over the surface 44. This is made easier by the substance having a high coefficient of viscosity and, as described above, by the drop of substance 20 being urged away from the notch 42 when the surface 87 overlaps said notch.

Thus, the person uses the device by squeezing the handle 83 towards the handle 13 along arrow 98 so that the anvil blade 84 brings the uncut stem against the cutting edge 10 of the cuttng blade, thereby beginning to form a notch in the stem. The anvil blade continues to thrust the stem and its cut face 99 against the surface 44 of the blade 9 which has already had the substance 20 spread thereover.

As a result, the surface 99 automatically has substance 20 spread thereon and is thus treated as mentioned in the introduction. In this cutting action, the anvil blade thrusts entirely against the cut stem and, by ejecting the cut portion 100 overlaps the notch 42 again. Since the two handles are close together, the control means 64 have co-operated with the metering valve means 52 to send another drop of substance 20 to the notch 42. While the notch is covered by the surface 87 of the anvil blade 84, the blades begin to return to their starting position, i.e. where they are separated from each other (FIG. 1), and the anvil blade 84 spreads more substance over the surface 44 of the blade 9.

If the person skilled in the art uses the device the other way around, with the anvil blade being used as the cutting blade, the surface 87 of the anvil blade is nevertheless covered with the substance 20 so the cut surface of the remaining portion of the stem is still treated.

This description thus shows the advantages of the device and the method. The treatment substance 20 is used solely for application to the "wound" and is not sprayed over a wide area. As a result, a given capsule volume can be used to treat a much larger number of plants and there is no risk of unwanted pollution. Further, since by virtue of an important characteristic the substance must be viscous, it can be less diluted and can therefore be used in smaller doses which never-the-less remain effective since none, or very little, of each dose is lost.

The person skilled in the art can thus treat a large number of plants without being obliged to frequently refill the device for simultaneously cutting and treating in accordance with the invention. Since the substance is concentrated, the capsules are very small and the person skilled in the art can therefore carry several capsules, thereby enabling one person to perform an entire day's pruning with simultaneous treatment on each cut of the pruning wound on each stem, without having to leave the job to obtain more treatment substance.

Finally, the handle 13 held by the ends of the fingers rolls against a spring in order to absorb the equivalent rotation of the fingers due to the handles moving towards each other, thereby avoiding blistering the fingers.

Figure 7:
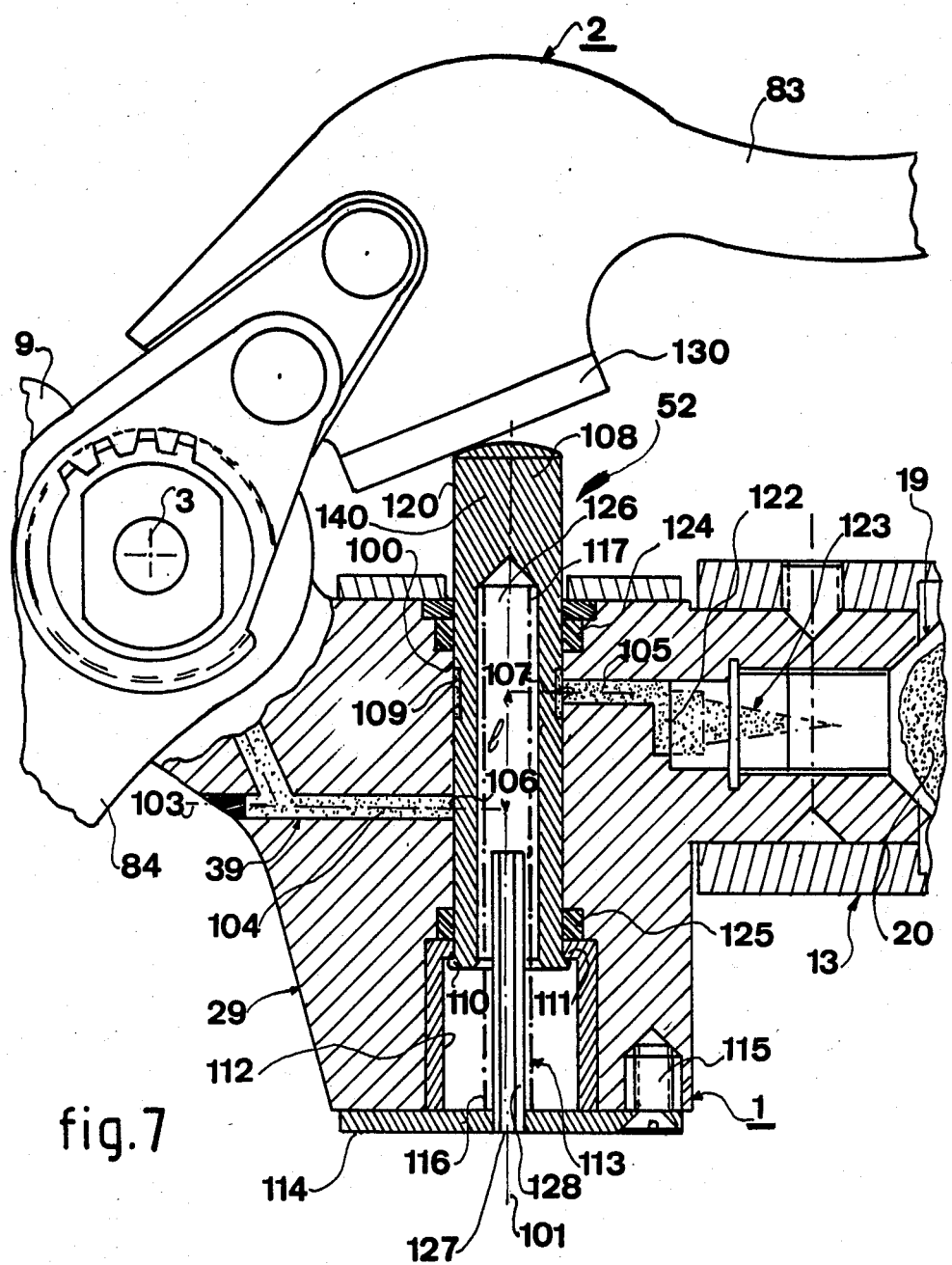
FIG. 7 is a partially cut-away view of an embodiment of an improvement relating to the substance injection means.

The embodiment shown in FIG. 7 shows an improvement over the device shown in FIGS. 1 to 6. This figure shows, at least partially, the two main parts 1 and 2 constituting the device, with the main part 1 having a cutting blade 9 at one end and with the main part 2 having an anvil blade 84 at one end, and with said two parts being pivotally mounted with respect to each other about a shaft 3.

More particularly, the main part 1 which has the cutting blade 9 comprises a solid body 29 forming a portion of the grasping handle 13 through which a duct 39 is made to put a capsule 19 containing a treatment substance 20 into communication with the outlet orifice into the cutting blade, as described above.

In FIG. 7, the solid body 29 includes controllable metering valve means 52 in an embodiment which is more advantageous than that described above since it includes only one piston slidably mounted in a cylindrical housing. These controllable metering valve means 52 comprise a cylindrical housing 100 running along an axis 101 which is substantially perpendicular to the axis 103 of the duct 39. More particularly, the duct 39 comprises at least two portions 104 and 105 having parallel axes 103 which open out into the cylindrical housing at two different levels 106 and 107 so that the two axes 103 belonging to said respective duct portions 104 and 105 are distant from each other by a length "1".

A piston 108 is slidably mounted in said cylindrical housing 100 to slide along the axis 101 of the cylindrical housing 100. A notch which is advantageously in the form of an annular groove 109 is formed in said piston. The piston 108 includes an abutment 111 which enables it to occupy an end-of-stroke position against a shoulder 111 made in a recessed portion 112 of the cylindrical housing 100. The piston 108 is held in this end-of-stroke position, for example, by the action of a compression spring 113 having its end 116 bearing against a cap 114 mounted on the solid body 29, e.g. by means of a screw 115, thus enabling the recessed portion 112 to be at least partially closed. While the spring 113 bears against the cap 114 by its end 116, its other end 117 exerts thrust on the piston 108 tending to hold it in an "extended" position which is the above-mentioned end-of-stroke position, with the abutment 110 coming against the shoulder 111. The notch 109 in the outer wall 120 of the piston 108 is situated in a position such that it is just opposite the portion of the duct 105 when the piston is in its "extended" position.

The piston can slide by compressing the spring 113 under the action, for example, of an abutment tab 130 fixed to the handle 83 forming a portion of the main part 2, said abutment tab 130 co-operating with the portion 140 of the piston which emerges from the solid body 29. The sliding amplitude to which the piston 108 can be subjected is defined in such a manner that when the spring is compressed and relative rotation of the two main parts 1 and 2 has brought the cutting and anvil blades over each other, the notch 109 comes level with the orifice 106 of the portion of duct 103 and is away from the orifice 107 of the portion of duct 105.

The duct 105 has its other end 122 connected by means of a capsule connector 123 with the inside of the capsule 19 containing the treatment substance 20.

It is advantageous for the piston to slide in the cylindrical housing in a sealed manner. Sealing is provided to at least some extent by accurate machining. However, in an advantageous embodiment, sealing is also ensured by two sealing rings 124 and 125 situated substantially at each end of the housing 100.

In order to allow the piston to slide solely when the main part 2 rotates relative to the main part 1, the piston includes an internal chamber 126 which is connected to the air by an opening 127 into a sleeve 128 which penetrates into the chamber 126, said sleeve 128 also serving to guide the spring 113 while it is being compressed.

The device as shown in FIG. 7 operates generally speaking as described above. However, in this particular case of simplified metering valve means, which are cheaper and lighter, the device operates as follows:

Firstly, the substance 20 is chosen so that it is compressible, i.e. so that it reduces in volume when subjected to high pressure, and so that its volume expands somewhat when the pressure falls again. Under these conditions, when the capsule 19 containing the substance 20 under a certain pressure is put into communication with the duct portion 105, the substance 20 flows into this duct portion and, if the piston 108 is in its "extended" abutment position, also flows into the notch 109 until the notch is filled with compressed substance.

On operating the two main parts so as to bring the main part 2 towards the main part 1, the extension 130 of the anvil blade 84 presses against the portion 140 of the piston which emerges from the solid body 29, thereby obliging the piston 108 to slide along the cylindrical housing 100 so that the notch 109 leaves its position facing the opening 107 and moves to a position where it faces the opening 106. In this case, the notch 109 is no longer in communication with the duct portion 105 and thus is no longer in communication within the inside of the capsule 19. The substance can thus expand and increase in volume so that a certain quantity of substance penetrates into duct portion 104 via the opening 106.

When the piston returns to its starting or "extended" position, the substance contained in the notch 109 is no longer compressed and this notch can thus be refilled with additional substance which is inserted therein under the effect of the pressure in the capsule 19. The substance 20 filling the notch 109 is then recompressed and is thus again ready to be inserted into duct portion 104 solely under the effect of its own expansion when the handles are operated again to bring the notch level with the orifice 106.

Thus, after a few operations which thrust successive doses of substance into the duct 9, the duct is filled with substance up to the orifice provided in the surface of the cutting blade. An additional operation then causes the substance to overflow from the orifice 41.

With this device, the metering valve means are very simple and, in addition, by suitably adjusting the pressure of the substance in the capsule, it is possible to measure out successive quantities of substance while only causing the substance to be transmitted when the cutting blade and the anvil blade are brought towards each other, i.e. when the handle 83 is rotated towards the grasping handle 13.

The advantage of such an embodiment of the metering valve means is that they comprise only one piston instead of the two pistons in the embodiment described in the parent patent, and the substance is transmitted towards the cutting blade only when the two handles move towards each other for cutting purposes, and under no circumstances when the handles move apart, thus providing a saving of substances which may be as much as 50% in comparison with the preceding embodiment.

In the above-described example, the capsule 19 contains a treatment substance 20 which is pressurized by a quantity of gas under pressure between the end 75 and the piston 73. However, this embodiment may present difficulties, in particular when the gas used is required to have a special composition in order to avoid accidents.

Figure 8:
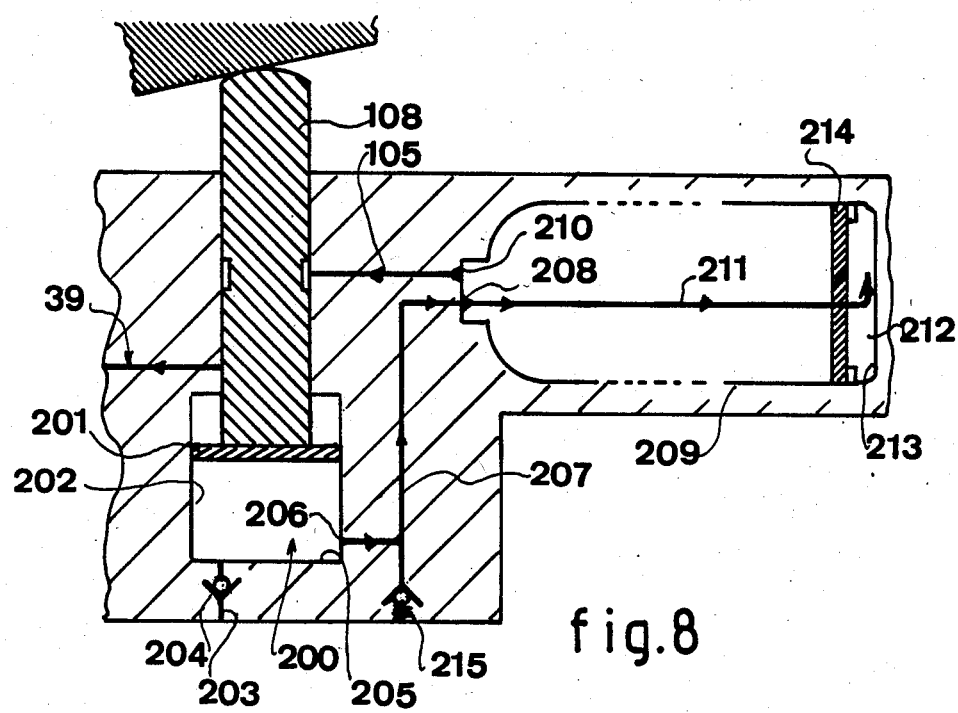
FIG. 8 is a diagram of another embodiment of an improvement of the element shown in FIG. 7.

FIG. 8 is a diagram showing an embodiment capable of eliminating the above-mentioned drawbacks.

In this embodiment, the piston 108 is coupled to air-pumping means 200 comprising a piston 201 sliding in a cylinder 202 including an air inlet 203 with a non-return valve 204. The end 205 of the cylinder includes an outlet 206 which is connected via a duct 207 to an air feed inlet 108 to a capsule 209, which capsule also includes an outlet 210 for the substance 20. In this case, in addition to the means constituting the capsule 19 described above, the capsule 209 includes a lower duct 211 connecting its inlet 208 to a pneumatic chamber 212 defined between its end 213 and a sliding piston 214. A duct 207 is advantageously connected to a rated safety valve 215 in order to avoid inflating the pneumatic chamber 212 beyond a safety limit.

Thus, as explained with reference to FIG. 7, when the device is used, each time a cut is made, the piston 108 is displaced, thereby pumping a quantity of air via the means 200 into the pneumatic chamber 212. The substance 20 is thus constantly under pressure, thus enabling the above-mentioned operation and result to be obtained.

Likewise, in the embodiments described above, the duct 39 for feeding the space between the two blades 9 and 84 opens out via an orifice 41 (or 42) with the anvil blade 84 helping to spread the drop of substance 20 over two faces 44 and 87 of the cutting blade 9 and the anvil blade 84 respectively as it moves past the orifice. It may be that the substance is not sufficiently spread by the blade. In this case, the orifice 41 is combined with means for encouraging the spreading of the substance over the faces 44 and 87.

Figure 9:
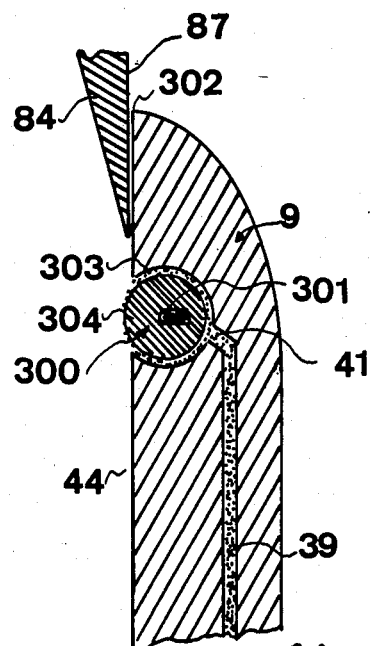
FIGS. 9 and 10 show two embodiments of cutting means for the device shown in FIGS. 1 to 8.

FIG. 9 shows a first embodiment of such means constituted by a roller 300 rotatably mounted about a shaft 301 which extends substantially parallel to the cutting edge 302 of the cutting blade 9 in a semicylindrical housing or recess within 303 blade pack 44 opening at the outlet orifice 41 from the duct 39 for the substance 20. The cylinder 300 is mounted about the shaft 301 in such a manner that a small portion 304 of its outer surface partially emerges through the face 44 of the cutting blade. The roller is advantageously made of a material capable of containing the substance 20 arriving under pressure via the duct 39 and of restituting a portion thereof under the effect of friction. In this case, when the anvil blade 84 covers the face 44 of the cutting blade 9 it comes into abutment against the portion 304 of the roller 300, thereby rotating it by friction with its overlapping face 87. During this movement, the face 87 is covered with the substance 20 as restituted by the material of the roller and in turn covers the portion of the face 44 of the cutting blade 9 over which it slides. As a result, in this case, the substance 20 is very well spread and the treatment substance is thus properly deposited on the cut wounds of plants.

Figure 10:
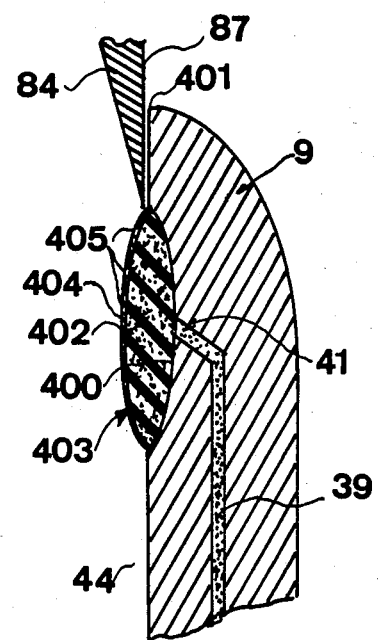

FIG. 10 shows a second embodiment of the means for improving spreading over the two faces of the cutting and anvil blades. In this case, the orifice 41 from the duct 39 is shaped as a groove 400 extending over a relatively long length substantially parallel to the cutting edge 401. A piece of spongy material 402 which is permeable to the substance 20 arriving via the duct 39 is placed in this groove 400. The material is covered with a cover 403 constituted by a flexible sheet 404 including a plurality of orifices 405, with the portion of material 402 being disposed in the groove so that it advantageously fills the entire space delimited between the bottom of the groove 400 and the flexible sheet 404.

In this second embodiment, when the anvil blade 84 arrives over the perforated flexible sheet 404, it presses thereagainst. As a result the spongy material 402 is compressed and thus disgorges substance through the orifices 405 in the sheet 404. The face 87 of the anvil blade 84 is thus covered with the substance and it in turn covers the face 44 of the cutting blade 9.

The device described above is well adapted to simultaneous manual pruning and treatment, for example of vine shoots in vinicultural areas. However, it can also be used for other plants such as fruit trees or ornamental trees. All that is required is a suitable choice of treatment substance together with its excipient in order to obtain a substance 20 which is suitable both as to its treatment quality and as it its capability for being spread over the "pruning wounds" on the plants.

This device constitutes an implement which is suitable both for professional use and for amateurs who require a good job to be done.

I claim:

1. In a device for simultaneous cutting and treating a plant stem, the device comprising:
    at least one cutting blade (9);
    at least one anvil blade (84) pivotally mounted relative to said cutting blade (9), and including a surface (87) suitable for sliding during rotation over at least a portion of a face (44) of said cutting blade;
    at least one store (19) of treatment substance (20);
    a channel (39) for said substance (20) made through at least a portion of the cutting blade (9) and opening out via at least one orifice (41, 42) situated in a face of said cutting blade;
    means (54, 64) for controlling the transmission of a certain determined quantity of said substance (20) from said store (19) to said orifice (41, 42);
    the improvement wherein said orifice opens within the face of the cutting blade slidable on said surface of said anvil at a given level, and wherein said means for controlling the transmission of said substance comprises means for causing a drop of said substance to be obtained at the outlet from said orifice when said surface (87) of the anvil blade is substantially opposite said face (44) of the cutting blade, and the device includes support means (8, 80) for said cutting blade (9) and for said anvil blade (84) in the form of two handles (13, 83), said two handles being respectively connected to said blades by respective mid-portions (11, 82), with rotation of said blades being driven about a rotary shaft (3) passing through said mid-portions, said store (19) being situated in a housing (17) provided in the handle (13) connected via one of said mid-portions (11) to said cutting blade (9), via a channel (39) having a portion (47) passing through said mid-portion (11) in order to connect said store (19) to said orifice (41, 42) provided in said cutting blade (9), whereby rotation of the cutting blade is effected with respect to the anvil blade such that the two surfaces (44, 87) of the blades, respectively overlap sufficiently that the orifice is partially or totally covered by anvil blade surface (87), thereby preventing treatment substance loss, minimizing consumption of treatment substance and insuring treatment application to the cut stem applied each time a cut is made.

2. A device according to claim 1, further including metering valve means (52) operatively disposed within said channel (39) and means (64) for controlling said metering valve means (52).

3. A device according to claim 2, wherein said metering valve means (52) are constituted by two valves (53, 54) mounted in series and intersecting said channel (39) at spaced positions to define therebetween a channel portion (63) of determined volume.

4. A device according to claim 3, wherein said store (19) is constituted by a capsule (19) containing said substance (20) and by means (73, 75) for putting said substance (20) in said capsule under pressure, said capsule (19) having an opening 937, (35) which is closed by a controllable valve member (66).

5. A device according to claim 1, wherein said substance (20) is a compressible substance.

6. A device according to claim 1, wherein said substance (20) has a high coefficient of viscosity.

7. A device according to claim 6, wherein said means for controlling the transmission of a certain determined quantity of said substance are constituted by:
    a cylindrical housing (100) intersecting said duct (39) and provided in a solid body (29) along an axis (101) extending at a non-zero angle to the axis (103) of said duct, with two ends (106, 107) of two portions (104, 105) of said duct opening out into said housing (100) at different levels;
    a piston (108) slidably mounted in said housing, said piston comprising on a side wall (120) thereof a notch (109) of a determined volume, said notch being made and located in such a manner that, when said piston slides, it occupies two positions level, respectively with two ends (106, 107) of said two duct portions; and
    means for subjecting said substance to a determined pressure.

8. A device according to claim 7, wherein said piston (108) includes at least one portion (140) which emerges from said body, an end-of-stroke abutment (110, 111, 112), and a spring (113) interposed between said piston (108) and said body (29, 114) in order to urge and return said piston to its end-of-stroke abutment position, and controllable means for exerting pressure on that portion (140) of said piston which projects from said body.

9. A device according to claim 7, wherein said means for subjecting said substance (20) to a determined pressure comprise a capsule (209) of substance (20), said capsule including a pneumatic chamber (212) at the end thereof, said chamber being separated from said substance by a sliding piston (214), inflation means (200) co-operating with the piston (108) being slidably mounted in said housing, and duct means (207, 211, 215) connecting said inflation means (200) to said pneumatic chamber (212).

10. A device according to claim 1, further including means carried by at least one of said blades for spreading said substance (20) as it emerges from said orifice (41, 42).

11. A device according to claim 10, wherein said means for spreading said substance comprise a roller (300) rotatably mounted in a hollow cylindrical recess (303) in said cutting blade (9) level with said face (44), with a portion of the side surface of said roller emerging from said hollow cylindrical recess, and with said orifice opening out into said hollow cylindrical recess.

12. A device according to claim 10, wherein the means for spreading said substance comprise a groove (400) made in said face (44) of said cutting blade (9), a flexible grating (404) permeable to said substance (405) covering said groove and defining a space, and a spongy material (402) permeable to said substance (20) filling said space, said orifice (41, 42) opening out into said space.

* * * * *